United States Patent
Munasinghe et al.

(10) Patent No.: US 9,802,620 B2
(45) Date of Patent: Oct. 31, 2017

(54) POSITION ERROR ESTIMATE AND IMPLEMENTATION FOR AUTONOMOUS DRIVING

(71) Applicant: GM GLOBAL TECHNOLOGY OPERATIONS LLC, Detroit, MI (US)

(72) Inventors: Chalan Munasinghe, Ann Arbor, MI (US); Curtis Hay, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/975,325

(22) Filed: Dec. 18, 2015

(65) Prior Publication Data
US 2017/0174223 A1    Jun. 22, 2017

(51) Int. Cl.
| | |
|---|---|
| *B60W 40/10* | (2012.01) |
| *G05D 1/02* | (2006.01) |
| *B60W 10/20* | (2006.01) |
| *B60W 10/18* | (2012.01) |
| *B60W 30/182* | (2012.01) |

(52) U.S. Cl.
CPC ............ *B60W 40/10* (2013.01); *B60W 10/18* (2013.01); *B60W 10/20* (2013.01); *B60W 30/182* (2013.01); *G05D 1/0278* (2013.01); *G05D 1/0285* (2013.01); *B60W 2400/00* (2013.01); *B60W 2550/402* (2013.01); *B60W 2550/406* (2013.01)

(58) Field of Classification Search
None
See application file for complete search history.

(56) References Cited

U.S. PATENT DOCUMENTS

| | | | |
|---|---|---|---|
| 6,253,128 B1* | 6/2001 | Kageyama | G05D 1/027 180/168 |
| 2010/0256852 A1* | 10/2010 | Mudalige | G08G 1/163 701/24 |
| 2011/0060496 A1* | 3/2011 | Nielsen | G06Q 10/0631 701/31.4 |
| 2014/0274115 A1* | 9/2014 | Michalson | H04W 4/028 455/456.1 |
| 2015/0221222 A1* | 8/2015 | Hamada | G05D 1/0297 701/2 |
| 2016/0153802 A1* | 6/2016 | Sato | G01C 21/3626 701/526 |

* cited by examiner

*Primary Examiner* — Rami Khatib
(74) *Attorney, Agent, or Firm* — Lorenz & Kopf, LLP

(57) ABSTRACT

Methods, systems, and vehicles are provided for controlling an automated system of a vehicle. In one example, the vehicle includes one or more automated driving systems, a plurality of input systems, and a processor. The plurality of input systems are used in connection with the vehicle, and are configured to provide inputs. The processor is coupled to the plurality of input systems, and is configured to at least facilitate: estimating a current position of the vehicle using the inputs from the plurality of input systems generating a current position estimate, estimating an error for the current position estimate, the error comprising an expected error radius for the current position estimate, and controlling the one or more automated driving systems using the current position estimate and the expected error radius.

17 Claims, 4 Drawing Sheets

POSITION ERROR ESTIMATE AND IMPLEMENTATION FOR AUTONOMOUS DRIVING

TECHNICAL FIELD

The technical field generally relates to a vehicle, and more particularly relates to the estimation and usage of position errors for autonomous driving systems of vehicles.

BACKGROUND

Recent years have seen development of autonomous, semi-autonomous, and otherwise automated vehicles. Such automated vehicles generally have one or more systems (e.g. a steering system, a braking system, and/or one or more other vehicle systems) that may be automatically operated by the vehicle. In addition, such automated vehicles are generally configured to operate in two modes: a "manual" mode in which the driver is able to manually operate the vehicle in the traditional manner, and an "automated" mode in which one or more of the systems of the vehicle are operated (wholly or in part) via a control system of the vehicle, independently of the driver.

Automated vehicles depend on position estimates for the vehicle for automated operation of the vehicle. However, it may be desirable to provide further improvements for implementing such position estimates in controlling the automated systems of automated vehicles.

Accordingly, it is desirable to provide techniques for implementing position estimates for autonomous driving. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In a first non-limiting example, a method is provided for controlling an automated system of a vehicle. The method comprises obtaining inputs from a plurality of input systems used in connection with the vehicle, estimating a current position of the vehicle using the inputs from the plurality of input systems, generating a current position estimate, estimating an error for the current position estimate, the error comprising an expected error radius for the current position estimate, and controlling the automated system using the current position estimate and the expected error radius.

In another non-limiting example, a system is provided for controlling an automated system of a vehicle. The system comprises a plurality of input systems and a processor. The plurality of input systems are used in connection with the vehicle, and are configured to provide inputs. The processor is coupled to the plurality of input systems, and is configured to at least facilitate: estimating a current position of the vehicle using the inputs from the plurality of input systems generating a current position estimate, and estimating an error for the current position estimate, the error comprising an expected error radius for the current position estimate; and In another non-limiting example, a vehicle is provided. The vehicle includes one or more automated driving systems, a plurality of input systems, and a processor. The plurality of input systems are used in connection with the vehicle, and are configured to provide inputs. The processor is coupled to the plurality of input systems, and is configured to at least facilitate: estimating a current position of the vehicle using the inputs from the plurality of input systems generating a current position estimate, estimating an error for the current position estimate, the error comprising an expected error radius for the current position estimate, and controlling the one or more automated driving systems using the current position estimate and the expected error radius.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Methods, systems, and vehicles are provided that utilize error estimates for vehicle position parameters in controlling one or more autonomous driving functions of a vehicle. In certain examples, the autonomous driving functions (e.g. an automatic steering function) are controlled using position errors and position error estimates for the vehicle, as described in greater detail further below in connection with FIGS. 1-4.

Figure 1:
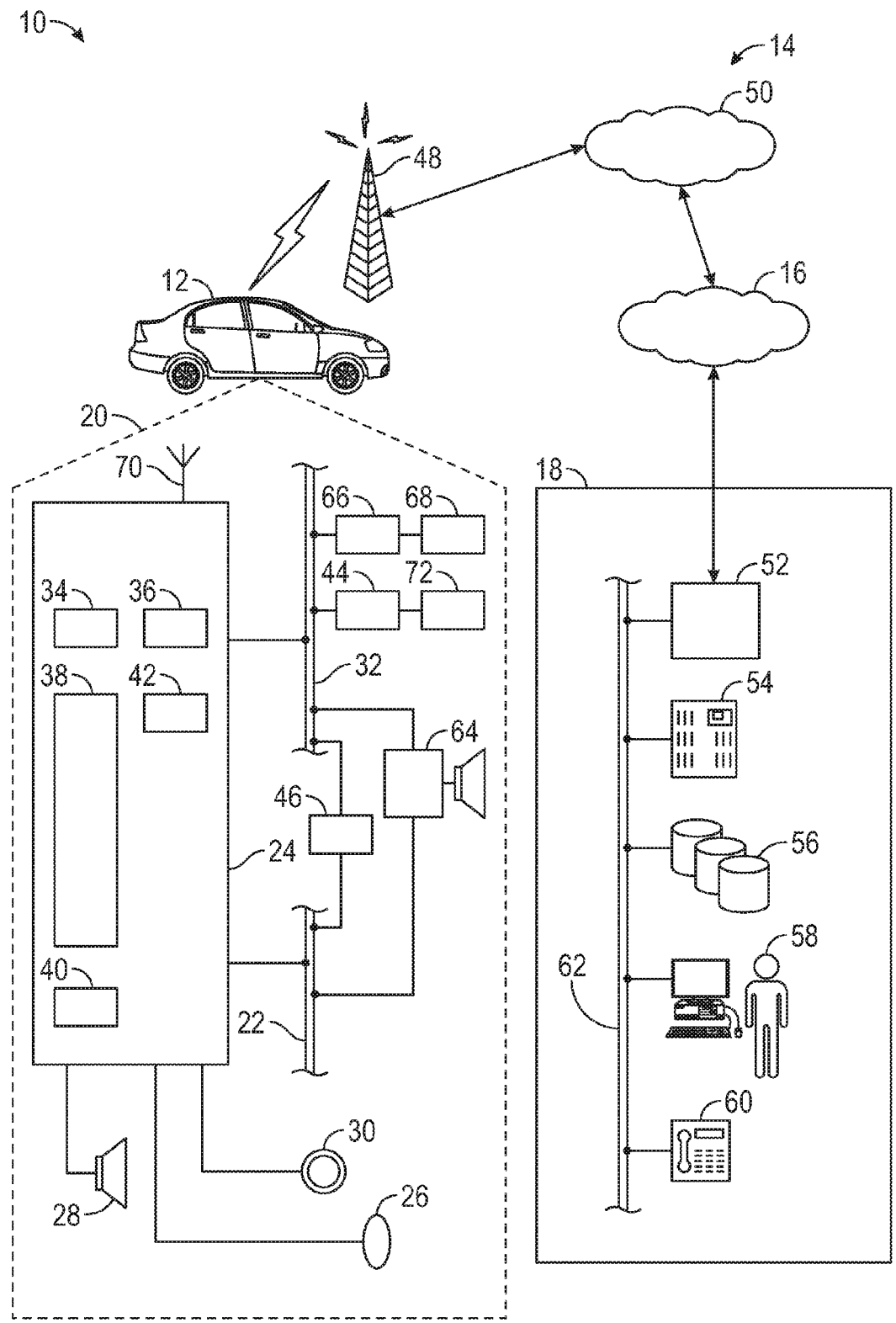
FIG. 1 is a schematic view illustrating a communications system that includes a vehicle, along with a wireless carrier system, a land network, and a call center, in accordance with a non-limiting example.

With reference to FIG. 1, there is shown a non-limiting example of a communication system 10 that may be used together with examples of the apparatus/system disclosed herein or to implement examples of the methods disclosed herein. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Figure 2:
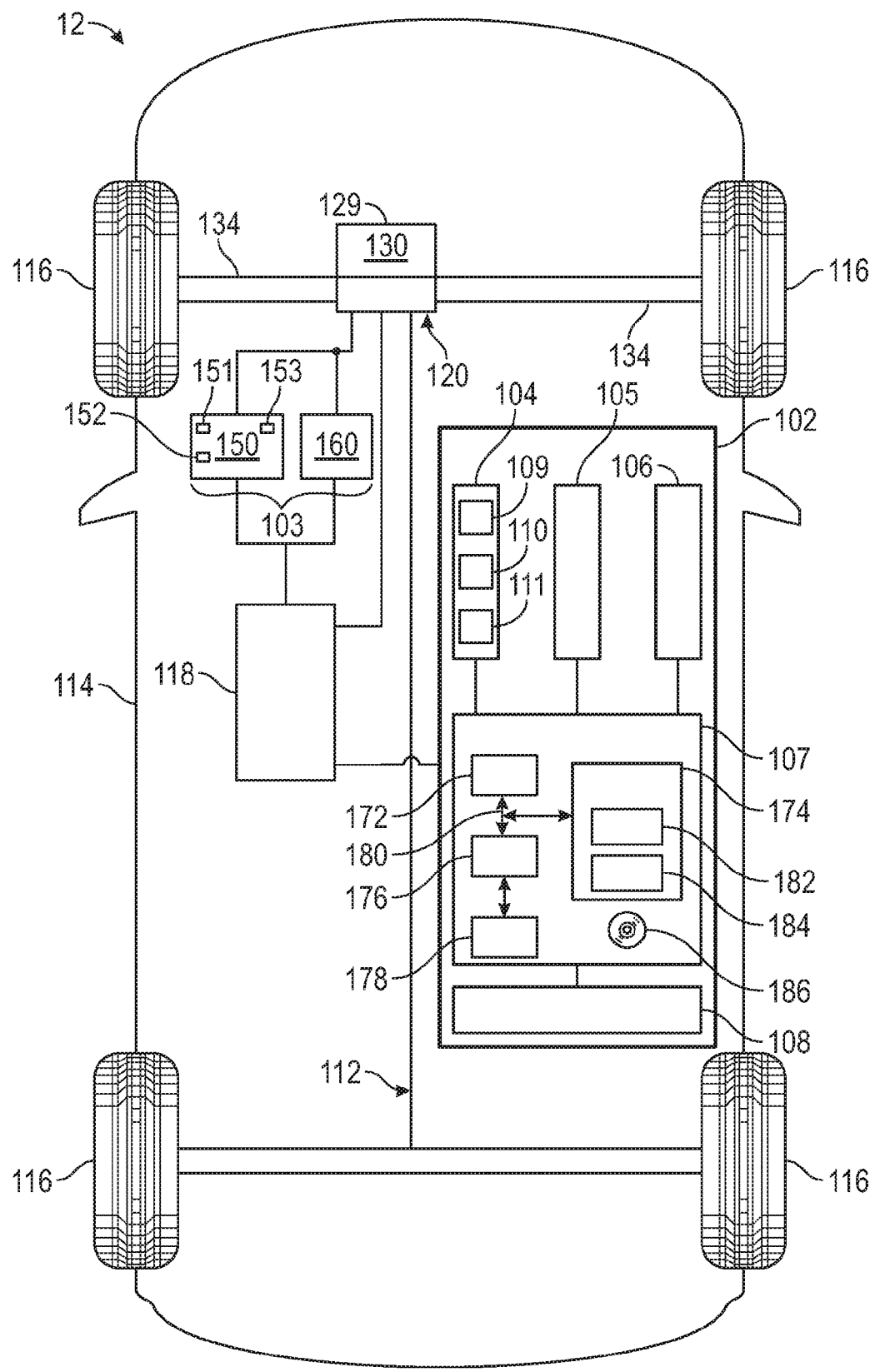
FIG. 2 is a functional block diagram of the vehicle of FIG. 1, including one or more automated driving systems and a control system, in accordance with a non-limiting example.

With reference to FIG. 2, certain features of the vehicle 12 are provided in accordance with the schematic presentation in FIG. 2. As depicted in FIG. 2 and described in greater detail further below, the vehicle 12 includes a control system 102 for controlling one or more automated systems 103 of the vehicle 12, such as a steering system 150 and/or braking system 160 of the vehicle 12, among other possible automated systems 103. As discussed further below, the control system 102 includes a sensor array 104, a satellite communication device 105, a cellular communication device 106, a controller 107, and a notification unit 108. In various examples, the controller 107 controls the automated systems 103 based on one or more operational modes for the vehicle 12, in accordance with the steps set forth further below in connection with the process 300 of FIGS. 3 and 4. Also in one example, the control system 102 is part of the telematics unit 24 of FIG. 1. In other examples, the control system 102 is coupled to the telematics unit 24.

As depicted in FIG. 2, the vehicle 12 includes, in addition to the above-referenced control system 102, a chassis 112, a body 114, four wheels 116, an electronic control system (ECS) 118, a steering system 150, and a braking system 160. The body 114 is arranged on the chassis 112 and substantially encloses the other components of the vehicle 12. The body 114 and the chassis 112 may jointly form a frame. The wheels 116 are each rotationally coupled to the chassis 112 near a respective corner of the body 114. In various examples the vehicle 12 may differ from that depicted in FIG. 1. For example, in certain examples the number of wheels 116 may vary. By way of additional example, in various examples the vehicle 12 may not have a steering system, and for example may be steered by differential braking, among various other possible differences.

In the example illustrated in FIG. 2, the vehicle 12 includes an actuator assembly 120. The actuator assembly 120 includes at least one propulsion system 129 mounted on the chassis 112 that drives the wheels 116. In the depicted example, the actuator assembly 120 includes an engine 130. In one example, the engine 130 comprises a combustion engine. In other examples, the actuator assembly 120 may include one or more other types of engines and/or motors, such as an electric motor/generator, instead of or in addition to the combustion engine. In certain examples, the electronic control system 118 comprises an engine control system that controls the engine 130 and/or one or more other systems of the vehicle 12.

Still referring to FIG. 2, the engine 130 is coupled to at least some of the wheels 116 through one or more drive shafts 134. In some examples, the engine 130 is mechanically coupled to the transmission. In other examples, the engine 130 may instead be coupled to a generator used to power an electric motor that is mechanically coupled to the transmission. In certain other examples (e.g. electrical vehicles), an engine and/or transmission may not be necessary.

The automated systems 103 provide automatic driving features, at least in certain modes, without involvement from the driver. In one example, the automated systems 103 provide for autonomous driving with respect to the automated systems 103 (with instructions provided by the control system 102, either directly or indirectly via the ECS 118) when in an automated mode, and allow for driver involvement and control when in a manual mode. In the depicted example, the automated systems 103 include a steering system 150 and a braking system 160. It will be appreciated that in certain examples the steering system 150 may be automated and not the braking system 160, or vice versa. It will also be appreciated that in certain examples various one or more other automated systems 103 may be utilized. For example, in certain examples, an automated system 103 may be utilized that automates braking and steering using inputs from cameras, radar, precise maps, and GPS, such as in the General Motors' "Supercruise" capability. In certain examples, the entire vehicle 12 (e.g. all vehicle systems) may be automated when in the automated mode, while in certain other examples only certain vehicle systems may be automated.

The steering system 150 is mounted on the chassis 112, and controls steering of the wheels 116. In the depicted example, the steering system 150 includes a steering wheel 151, a steering column 152, and a turn signal 153. In various examples, when in a manual mode, the steering wheel 151 and turn signal 153 receive inputs from a driver of the vehicle 12 when a turn is desired, and the steering column 152 results in desired steering angles for the wheels 116 via the drive shafts 134 based on the inputs from the driver. Also in certain examples, when in an automated mode, the steering system 150 utilizes steering commands from the control system 102 (either directly from the control system 102 and/or indirectly via the ECS 118 of FIG. 2), with no involvement from the driver. Also in certain examples, the steering system 150 includes an automatic lane centering functionality when in the automated mode.

The braking system 160 is mounted on the chassis 112, and provides braking for the vehicle 12. When in a manual mode, the braking system 160 receives inputs from the driver via a brake pedal (not depicted), and provides appropriate braking via brake units (also not depicted). Also in certain examples, when in an automated mode, the braking system 160 utilizes braking commands from the control system 102 (either directly from the control system 102 and/or indirectly via the ECS 118 of FIG. 2), with no involvement from the driver.

The control system 102 is mounted on the chassis 112. As discussed above, the control system 102 controls one or more automated systems 103 of the vehicle 12 (e.g. automatic steering, automatic braking, and/or other automated systems 103), including the selective operation of the automated systems 103 in a manual mode versus an automated mode, as discussed in greater detail further below. In certain examples, the control system 102 may comprise, may be part of, and/or may be coupled to the electronic control system 118, the steering system 150, one or more active safety systems, the telematics unit 24, a lane centering system, and/or one or more other systems of the vehicle 12.

As noted above and depicted in FIG. 2, in one example the control system 102 comprises a sensor array 104, a satellite communication device 105, a cellular communication device 106, a controller 107, and a notification unit 108.

The sensor array 104 includes various sensors (also referred to herein as sensor units and/or detection units) that are used for monitoring the vehicle 12. In one example, the sensor array 104 corresponds to the vehicle sensors 72 of FIG. 1. Also in one example, the sensor array 104 includes one or more inertial measurement sensors 109 that measure inertial measurement values for the vehicle 12 (e.g. one or more gyro yaw sensors for measuring a gyro yaw rate for the vehicle 12), along with one or more wheel speed sensors 110 (e.g. coupled to one or more wheels 116 of the vehicle 12) and transmission gear sensors (e.g. for detecting a transmission state, e.g. forward or reverse, for the vehicle 12). The sensors of the sensor array 104 provide the respective measurements and values to the control system 102 for processing.

The satellite communication device 105 includes one or more devices, systems, and/or components for communicating with one or more satellites. In various examples, the satellite communication device 105 includes one or more global navigation satellite systems (GNSS). In one example, the satellite communication device 105 comprises one or more global positioning system (GPS) devices, including one or more GPS receivers configured to communicate with GPS satellites. Also in one example, the satellite communication device 105 includes the GPS chipset/component 42 of FIG. 1. In addition, in certain examples, the satellite communication device 105 may include one or more devices, systems, and/or components (e.g. receivers) for communicating with one or more satellite systems such as, by way of example, the Russian based GLONASS system (among other possible satellite systems). The satellite communication device 105 obtains corresponding position values for the vehicle 12 (e.g. as obtained via one or more satellites) to the control system 102 for processing.

The cellular communication device 106 includes one or more devices, systems, and/or components for communicating with one or more cellular wireless systems. In one example, the cellular communication device 106 includes one or more cellular modems configured to communicate cellular communication towers. In addition, in one example, the cellular communication device 106 includes the cellular chipset/component 34 of FIG. 1. Also in one example, the cellular communication device 106 receives information, via the cellular wireless systems, regarding error transmissions from or pertaining to satellites (including satellites that may also be utilized as part of the satellite communication device 105), and transmits this information to the control system 102 for processing.

As depicted in FIG. 2, the controller 107 comprises a computer system. In certain examples, the controller 107 may also include one or more of the sensors of the sensor array 104, the satellite communication device 105, and/or the cellular communication device 106, one or more other devices and/or systems, and/or components thereof. In addition, it will be appreciated that the controller 107 may otherwise differ from the example depicted in FIG. 2. For example, the controller 107 may be coupled to or may otherwise utilize one or more remote computer systems and/or other control systems, such as the electronic control system 118 and/or the steering system 150 of FIG. 2, and/or one or more other systems of the vehicle 12.

In the depicted example, the computer system of the controller 107 includes a processor 172, a memory 174, an interface 176, a storage device 178, and a bus 180. In one example, the processor 172 and memory 174, correspond to the electronic processing device 38 and electronic memory 40, respectively, of FIG. 2. The processor 172 performs the computation and control functions of the controller 107, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 107 and the computer system of the controller 107, generally in executing the processes described herein, such as the process 300 described further below in connection with FIGS. 3 and 4.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted example, the memory 174 stores the above-referenced program 182 along with various stored matter (e.g. a Kalman filter).

The bus 180 serves to transmit programs, data, status and other information or signals between the various components of the computer system of the controller 107. The interface 176 allows communication to the computer system of the controller 107, for example from a system driver and/or another computer system, and can be implemented using any suitable method and apparatus. In one example, the interface 176 obtains the various data from the sensors of the sensor array 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one example, the storage device 178 comprises a program product from which memory 174 can receive a program 182 that executes one or more examples of one or more processes of the present disclosure, such as the steps of the process 300 (and any sub-processes thereof) described further below in connection with FIGS. 3-4. In another example, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the controller 107 may also otherwise differ from the example depicted in FIG. 2, for example in that the computer system of the controller 107 may be coupled to or may otherwise utilize one or more remote computer systems and/or other control systems.

The notification unit 108 is coupled to the controller 107, and provides notifications for the driver of the vehicle 12. In certain examples, the notification unit 108 provides audio, visual, haptic, and/or other notifications to the driver based on instructions provided from the controller 107 (e.g. from the processor 172 thereof), for example with respect to the estimate of the position of the vehicle 12, the operational modes for the vehicle 12, and for a notification as to whether the automated systems 103 of FIG. 2 are in an automated mode versus a manual mode. Also in various examples, the notification unit 108 performs these and other functions in accordance with the steps of the process 300 described further below in connection with FIGS. 3 and 4.

While the components of the control system 102 (including the sensor array 104, the controller 107, and the notification unit 108) are depicted as being part of the same system, it will be appreciated that in certain examples these features may comprise two or more systems. In addition, in various examples the control system 102 may comprise all or part of, and/or may be coupled to, various other vehicle devices and systems, such as, among others, the actuator assembly 120, the electronic control system 118, the steering system 150, and/or one or more other systems of the vehicle 12.

Figure 3:
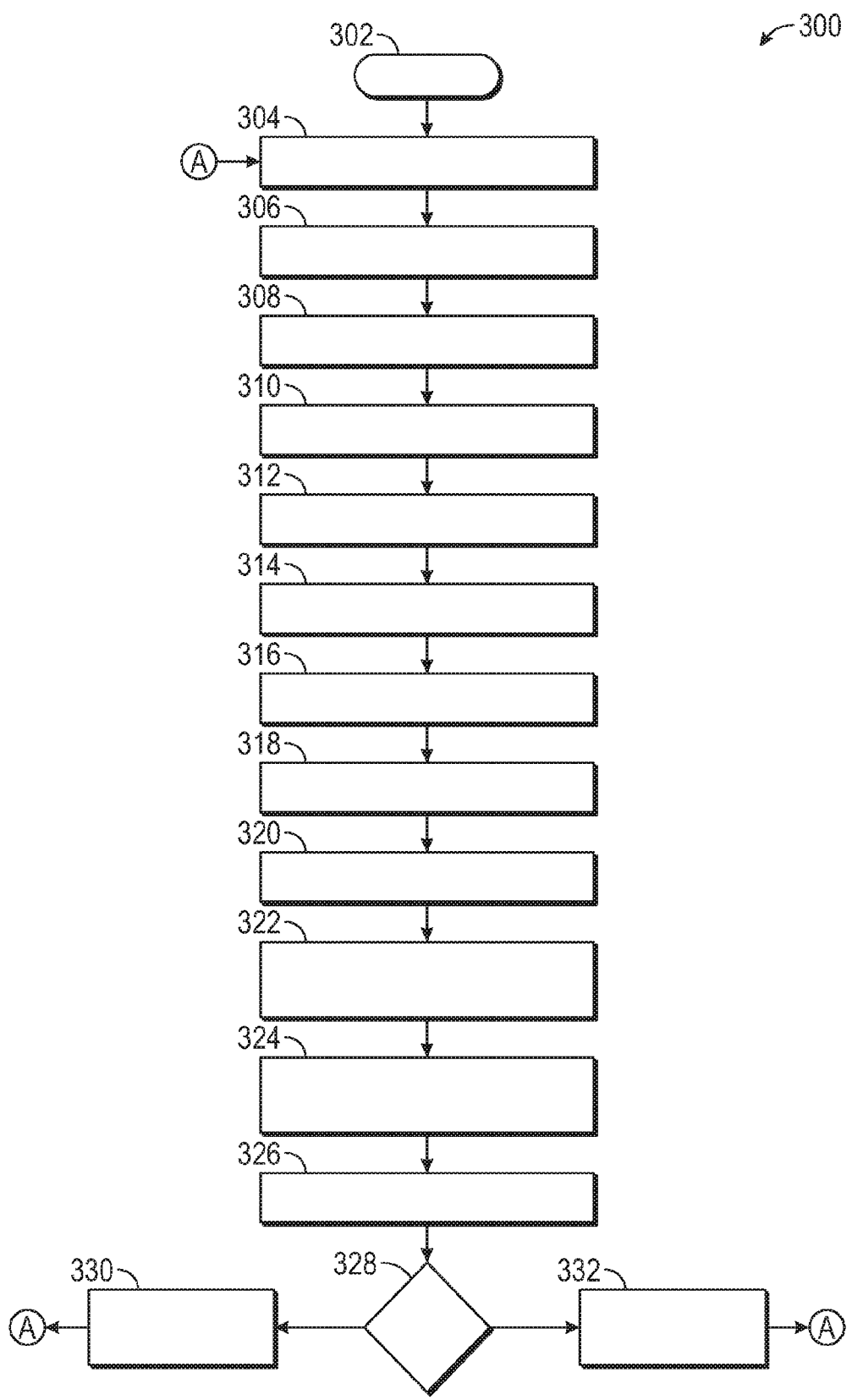
FIG. 3 is a flowchart of a process for implementing position estimates for one or more autonomous driving systems for a vehicle, and that can be implemented in connection with the communication system of FIG. 1 and the vehicle of FIGS. 1 and 2, in accordance with a non-limiting example.

FIG. 3 is a flowchart of a process 300 for implementing location error information for one or more autonomous driving systems for a vehicle, in accordance with a non-limiting example. In one non-limiting example, the process 300 can be implemented in connection with the communication system 10 of FIG. 1 and the vehicle 12 of FIGS. 1 and 2.

As depicted in FIG. 3, the process 300 is initiated at step 302. For example, in various examples, the process 300 may be initiated when the vehicle 12 starts in a driving mode, for example at the beginning of a current vehicle drive or ignition cycle, as detected by one or more transmission gear sensors 111 of FIG. 2. In one example, the process 300 is initiated when a driver has engaged an ignition of the vehicle 12 (e.g. by turning a key of the ignition, pressing a start button, and/or engaging a keyfob). In one example, the process 300 continues throughout the ignition cycle or vehicle drive.

Satellite position data is obtained (step 304). In one example, satellite position data is obtained via the satellite communication device 105 of FIG. 2 pertaining to a current position or location of the vehicle 12 of FIGS. 1 and 2, based on information provided via one or more satellites via one or more GNSS systems. Also in one example, the satellite position data includes an estimated longitude and latitude for the vehicle 12. In addition, in one example, the satellite position data is obtained via one or more receivers, disposed on or within the vehicle 12, of the satellite communication device 105, that communicates with one or more satellite communication systems (such as GPS and/or GLONASS).

In addition, a first error estimate is provided for the satellite position data (step 306). In one example, the first error estimate of step 306 comprises an expected error for a position associated with the satellite position data of step 304. Also in one example, the first error estimate of step 306 comprises an expected error radius, or margin of error radius, for a position associated with the satellite position data of step 304. In one example, the first error estimate of step 306 is in the form of "plus or minus X", in which "X" may comprise any one of a number of units of measurement (e.g. "X" feet, "X" meters, "X" centimeters, and so on). Also, in one example, the first error estimate of step 306 is provided via the satellite communication device 105 along with the satellite position data of step 304. In one example, the first error estimate of step is calculated using GNSS satellite inputs, with parameters including the following: Doppler, pseudo range estimates, carrier phase measurements, and orbit information. Also in one example, the quality and latency of these inputs is used to evaluate at a particular frequency (e.g. 10 Hz, in one example) to compute the first error estimate, as well as for use in calculating an absolute position error estimate (as discussed further below). In one example, the first error estimate is expressed in units of meters, although in other examples other units may be utilized (e.g. feet, centimeters, and so on).

Vehicle measurement data is obtained (step 308). In one example, inertial measurement data is obtained via one or more sensors of the sensor array 104 of FIG. 2. Also in one example, the vehicle measurement data includes one or more inertial measurement values for the vehicle 12 of FIGS. 1 and 2 (e.g. one or more gyro yaw rates for the vehicle 12 measured via one or more inertial measurement sensors 109, such as yaw sensors, of the sensor array 104), along with one or more wheel speed values (e.g. measured by one or more wheel speed sensors 110 of the sensor array 104) and a transmission gear status for the vehicle (e.g. forward or reverse, as measured or detected by one or more transmission gear sensors 111 of the sensor array 104). Also in one embodiment, the vehicle data of step 306 is used for what is commonly referred to in the industry as "DR" (for "dead reckoning" or "deduced reckoning" analysis, for example, in which the vehicle's current position is calculated by using a predetermined position and advancing that position based on known or estimated speeds over elapsed time and course).

In addition, a second error estimate is provided for the vehicle measurement data (step 310). In one example, the second error estimate of step 310 comprises an expected error for a position associated with the vehicle measurement data of step 308. Also in one example, the second error estimate of step 310 comprises an expected error radius, or margin of error radius, for a position associated with the vehicle measurement data of step 308. In one example, the second error estimate of step 310 is in the form of "plus or minus X", in which "X" may comprise any one of a number of units of measurement (e.g. "X" feet, "X" meters, "X" centimeters, and so on). Also, in one example, the second error estimate of step 310 is provided via the sensor array 104 along with the vehicle measurement data of step 308. In one example, the second error estimate of step 310 is calculated using vehicle sensor inputs that include the following: gyro yaw rate, wheel rotational speeds, and transmission gear status (e.g. forward or reverse). Also in one example, the quality and latency of these inputs is used to evaluate at a particular frequency (e.g. 10 Hz, in one example) to compute the second error estimate, as well as for use in calculating an absolute position error estimate (as discussed further below). In one example, the second error estimate is expressed in units of meters, although in other examples other units may be utilized (e.g. feet, centimeters, and so on).

Additional data is obtained (step 312). In one example, the additional data comprises satellite correction data that is broadcast regarding possible errors and/or corrections corresponding to various satellites, including the satellites utilized for the satellite position data of step 304. Also in one example, the additional data of step 312 is obtained via the cellular communication device 106 of FIG. 2, for example using a cellular modem of the cellular communication device 106.

In addition, a third error estimate is provided for the additional data (step 314). In one example, the third error estimate of step 314 comprises an expected error for a position associated with the additional data of step 312. Also in one example, the third error estimate of step 314 comprises an expected error radius, or margin of error radius, for a position associated with the additional data of step 312. In one example, the third error estimate of step 314 is in the form of "plus or minus X", in which "X" may comprise any one of a number of units of measurement (e.g. "X" feet, "X" meters, "X" centimeters, and so on). Also, in one example, the third error estimate of step 314 is provided via the cellular communication device 106 along with the additional data of step 312. In one example, the third error estimate of step 314 is calculated using GNSS satellite Precise Point Positioning (PPP) state corrections including orbital corrections, satellite clock corrections, ionospheric signal delay, and tropospheric signal delay. Also in one example, the quality and latency of these inputs is used to evaluate at a particular frequency (e.g. 10 Hz, in one example) to compute the third error estimate, as well as for use in calculating an absolute position error estimate (as discussed further below). In one example, the third error estimate is expressed in units of meters, although in other examples other units may be utilized (e.g. feet, centimeters, and so on).

Data is entered into a Kalman filter (step 316). In one example, the satellite position data of step 304, the satellite position error estimate of step 306, the vehicle measurement data of step 308, the vehicle measurement error estimate of step 310, the additional data of step 312, and the additional data error estimate of step 314 are each provided as inputs to the Kalman filter. Also in one examples, the Kalman filter is stored in the memory 174 of FIG. 2 as stored matter 184 therein, and each of these inputs are processed, using the Kalman filter, via the processor 172 of FIG. 2.

Position estimates are calculated (step 318). In one example, estimates of lateral and longitudinal components of a current position of the vehicle 12 of FIGS. 1 and 2 are calculated via the processor 172 of FIG. 2 using the satellite position data of step 304, the vehicle measurement data of step 308, and the additional data of step 312.

Figure 4:
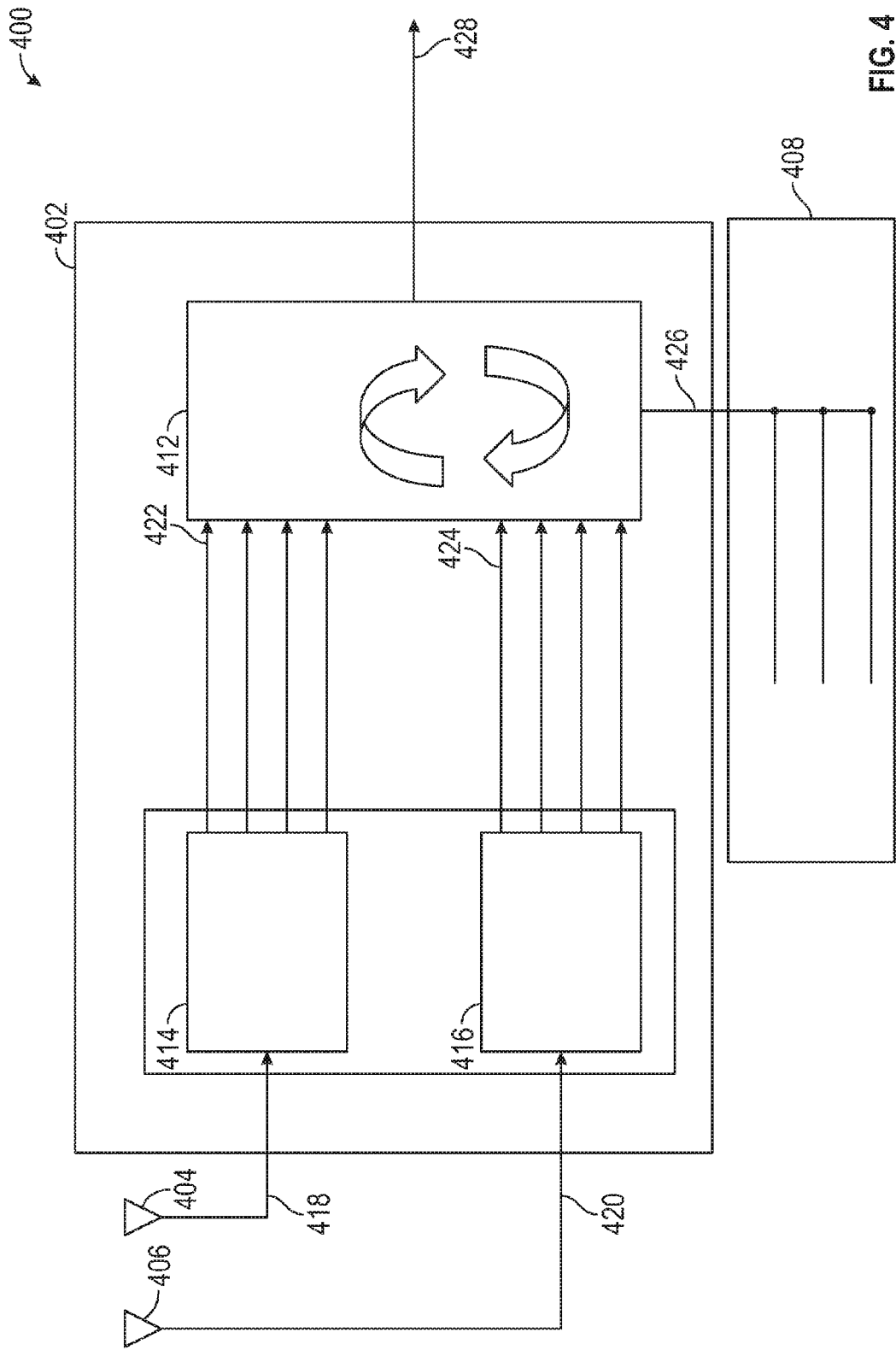
FIG. 4 is a schematic diagram illustrating an exemplary implementation of the process of FIG. 3.

With reference to FIG. 4, in one example, an external satellite communication system 404 (e.g. GPS, GLONASS) provides radio frequency (RF) signals 318 to a receiver 414 of the satellite communication device 105 of FIG. 1, which in turn provides, from the external satellite communication system 404 to the Kalman filter 412, data 422 pertaining to code measurements, carrier phase, orbits, ionosphere, time, and position fix pertaining to satellites of the external satellite communication system 404 monitoring a lateral and longitudinal position of the vehicle 12. Also as depicted in FIG. 4, an external cellular communication system 406 (e.g. from a wireless, cellular communications provider) provides radio frequency (RF) signals 420 to a cellular modem (e.g. a 4G-LTE modem, in one non-limiting example) of the cellular communication device 106 of FIG. 1, which in turn provides, from the external cellular communication system 406 to the Kalman filter 412, data 424 pertaining to ionosphere delay, troposphere delay, satellite orbits, and satellite clocks pertaining to the satellites of the external satellite communication system 404. In one example, the data 424 includes data used for precise precision point analysis by the Kalman filter 412. Also as depicted in FIG. 4, various vehicle sensors 408 (e.g. of the sensor array 104 of FIG. 2) provide, to the Kalman filter 412, vehicle sensor data 426 including a gyro yaw rate for the vehicle 12, differential wheel speeds for the vehicle 12, and a transmission gear status (e.g. forward or reverse) for the vehicle 12. In one example, the data 426 includes data used for DR (dead reckoning) analysis by the Kalman filter 412. Also as depicted in FIG. 4, the processor 172 of FIG. 2, using the Kalman filter 412, filters and processes the various inputs to generate various outputs 428. In one example, the outputs 428 include an estimate of a precise latitudinal and longitudinal position or location of the vehicle 12, along with related measures including a heading, a speed, and an elevation for the vehicle 12, in addition to related estimates for time and quality metrics pertaining to the estimates.

In addition, an aggregate error estimate is determined (step 322). Specifically, in one example, the aggregate error estimate of step 322 is calculated by the processor 172 of FIG. 2 and the Kalman filter 412 of FIG. 4 using each of the respective component error estimates from the input systems, namely the first error estimate of step 306, the second error estimate of 310, and the third error estimate of step 314. In one example, the aggregate error estimate of step 322 is in the form of "plus or minus X", in which "X" may comprise any one of a number of units of measurement (e.g. "X" feet, "X" meters, "X" centimeters, and so on). In one example, the aggregate error estimate of step 322 comprises an absolute position error (APEEthat is calculated using the following: (i) GNSS satellite inputs (Doppler, pseudo range estimates, carrier phase measurements, orbit information); (ii) vehicle sensor inputs (gyro yaw rate, wheel rotational speeds, transmission gear); and (iii) GNSS satellite Precise Point Positioning (PPP) state corrections including orbital corrections, satellite clock corrections, ionospheric signal delay, and tropospheric signal delay. Also in one example, the quality and latency of each of these inputs is used to evaluate at a particular frequency (e.g. 10 Hz, in one example) to compute the APEE. In one example, the APEE is expressed in units of meters, although in other examples other units may be utilized (e.g. feet, centimeters, and so on). In one example, the Kalman Filter is utilized via the control system 102 of FIG. 2, within a telematics electronics module (e.g. telematics unit 24) of the vehicle 12 of FIGS. 1 and 2, to computer the APEE using the inputs provided above at a continuous frequency (e.g. 10 Hz, in one example, although the frequency may vary in other embodiments).

Data is provided for the user (step 322). In one example, the estimate of the position of the vehicle 12 from step 318, along with the aggregate error estimate of step 320, are provided for the user via the notification unit 108 of FIG. 2. In one example, an audio and/or visual notification is provided of the estimated position of the vehicle 12 (including latitude and longitude), along with an expected error radius (e.g. a "margin of error" for the position estimate). In certain examples, the position estimate and error estimate are also indicated on a displayed map for the user (e.g. on a vehicle navigation system of or associated with the notification unit 108). In addition, in certain examples, additional information from the Kalman filter, such as heading, speed, elevation, time, and/or quality metrics) are also provided. In various examples, the notification unit 108 may provide audio, visual, and/or other notifications of such values for a user (e.g. for the driver of the vehicle 12).

In addition, in step 324, one or more of the automated systems 103 of FIG. 2 are controlled based on the position estimate of step 318 and the error estimate of step 320. In various examples, this control is exercised via instructions provided by the processor 172 of FIG. 2 based on the position estimate of step 318 and the error estimate of step 320.

A threshold error value is retrieved from memory (step 326). In one example, a predetermined threshold error value is retrieved from the memory 174 of FIG. 2 as part of the stored matter 184 thereof for use by the processor 172 of FIG. 2. In one example, the predetermined threshold error value comprises a predetermined error radius threshold value, such that one or more automated features are only permitted in the automated mode if the calculated error radius is less than the predetermined threshold value. In one such example, the threshold error value is equal to two meters; however, this may vary in other embodiments.

In step 328, a determination is made as to whether the calculated aggregate error estimate of step 320 is less than the predetermined threshold value of step 326. In one example, during step 328, the processor 172 of FIG. 2 determines whether an expected error radius value as calculated in step 320 is less than the predetermined threshold of step 326.

If it is determined that the aggregate error estimate of step 320 is less than the predetermined threshold of step 326, then one or more automated systems 103 of FIG. 2 are operated in an automated mode, in which such systems 103 are automatically controlled via the vehicle 12 itself (e.g. the control system 102 and/or the ECS 118) without driver involvement. In one example, the automated mode is implemented via instructions provided via the processor 172 of FIG. 2 (e.g. to the ECS 118 of FIG. 2 and/or to the automated system(s) 103 of FIG. 2). In one example, the steering system 150 of FIG. 2 is operated in an automated mode in step 330. In another example, the braking system 160 of FIG. 2 is operated in an automated mode in step 330. In yet another example, both the steering system 150 and the braking system 160 are operated in an automated mode in step 330. In certain examples, an automated system 103 that automates braking and steering using inputs from cameras, radar, precise maps, and GPS (such as in the General Motors' "Supercruise" capability) may be enabled, or operated in an automated mode, in step 330. In still other examples, one or more other automatic systems 103 may be operated in respective automated modes in step 330.

In certain examples, the affected automatic system(s) 103 are operated completely without driver involvement while in the manual mode. In certain other examples, in the automatic mode, the affected automatic system(s) 103 may still be able to be overridden by a driver override in certain examples (e.g. if the driver engages the brake pedal or steering wheel, in one example). In one example, the process then returns to step 304 as depicted in FIG. 3 for a new iteration.

Conversely, if it is determined that the aggregate error estimate of step 320 is greater than or equal to the predetermined threshold of step 326, then one or more automated systems 103 of FIG. 2 are operated in a manual mode, with driver involvement (step 332). In one example, the manual mode is implemented via instructions provided via the processor 172 of FIG. 2 (e.g. to the ECS 118 of FIG. 2 and/or to the automated system(s) 103 of FIG. 2). In one example, the steering system 150 of FIG. 2 is operated in a manual mode in step 332. In another example, the braking system 160 of FIG. 2 is operated in a manual mode in step 332. In yet another example, both the steering system 150 and the braking system 160 are operated in a manual mode in step 332. In certain examples, an automated system 103 that automates braking and steering using inputs from cameras, radar, precise maps, and GPS (such as in the General Motors' "Supercruise" capability) may be disabled, or operated in a manual mode, in step 332. In still other examples, one or more other automatic systems 103 may be operated in a manual mode in step 332. In certain examples, the affected automatic system(s) 103 are operated completely by the driver while in the manual mode. In certain other examples, in the manual mode, the affected automatic system(s) 103 may be operated by the driver with some automatic assistance as may be required (e.g. via power steering, panic braking assist, or the like, under appropriate conditions). In one example, the process then returns to step 304 as depicted in FIG. 3 for a new iteration.

Accordingly, in the depicted example, the selected automated systems 103 are only operated in the automated mode if there is sufficient confidence in the position estimate (e.g. with a sufficiently low error radius). Otherwise, if there is not sufficient confidence in the position estimate (e.g. with a relatively higher error radius), then the selected automated systems are operated instead in the manual mode.

It will be appreciated that the disclosed methods, systems, and vehicles may vary from those depicted in the Figures and described herein. For example, the communication system 10, the vehicle 12, the control system 102, and/or various components thereof may vary from that depicted in FIGS. 1 and 2 and described in connection therewith. In addition, it will be appreciated that certain steps of the process 300 may vary from those depicted in FIGS. 3 and 4 and/or described above in connection therewith. It will similarly be appreciated that certain steps of the methods described above may occur simultaneously or in a different order than that depicted in FIGS. 3 and 4 and/or described above in connection therewith.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method for controlling an automated system of a vehicle, the method comprising:
    obtaining inputs from a plurality of different input systems used in connection with the vehicle;
    estimating a current position of the vehicle using the inputs from each of the plurality of different input systems, generating a current position estimate based on the estimating;
    estimating an aggregate error for the current position estimate, the aggregate error comprising an aggregate expected error radius for the current position estimate, wherein the aggregate expected error radius is estimated by:
  estimating a respective error measure for each of the plurality of different input systems, the respective error measure comprising, for each particular input system, a respective error radius for the particular input system; and
  aggregating the respective error measures for each of the plurality of different input systems; to thereby generate the aggregate error comprising the aggregate expected error radius for the current position estimate; and
controlling the automated system using the current position estimate and the aggregate expected error radius.

2. The method of claim 1, wherein:
the step of obtaining the inputs comprises obtaining inputs from a satellite-based positioning system, a cellular communication system, and one or more vehicle sensors; and
the step of estimating the current position comprises estimating the current position of the vehicle using inputs from the satellite-based positioning system, the cellular communication system, and the one or more vehicle sensors.

3. The method of claim 1, wherein:
the step of obtaining the inputs comprises obtaining satellite position inputs from a global positioning system (GPS) or global orbiting navigation satellite system (GLONASS), obtaining satellite correction data from a cellular communication system, and vehicle inertial measurement data provided via an inertial measurement sensor of the vehicle; and
the step of estimating the current position comprises estimating the current position of the vehicle using the satellite position inputs from the GPS or GLONASS system, the satellite correction data from the cellular communication system, and the vehicle inertial measurement data from the inertial measurement sensor of the vehicle.

4. The method of claim 3, wherein:
the step of estimating the respective error measure for each of the plurality of different input systems comprises:
  obtaining a first error estimate from the global positioning system (GPS) or global orbiting navigation satellite system (GLONASS);
  obtaining a second error estimate from the cellular communication system; and
  obtaining a third error estimate from the inertial measurement sensor; and
the step of aggregating the respective error measures for each of the plurality of different input systems comprises estimating the aggregate expected error radius using the first error estimate, the second error estimate, and the third error estimate.

5. The method of claim 1, further comprising:
retrieving a predetermined error threshold from memory;
wherein the step of controlling the automated system comprises:
operating the automated system in an automatic mode, without driver intervention, if the aggregate expected error radius is less than the predetermined error threshold; and
operating the automated system in a manual mode, without driver intervention, if the aggregate expected error radius is greater than the predetermined error threshold.

6. The method of claim 5, wherein:
the automated system comprises a steering system of the vehicle;
the step of operating the automated system in the automated mode comprises operating the steering system in the automated mode if the aggregate expected error radius is less than the predetermined error threshold; and
the step of operating the automated system in the manual mode comprises operating the steering system in the manual mode if the aggregate expected error radius is greater than the predetermined error threshold.

7. The method of claim 5, wherein:
the automated system comprises a braking system of the vehicle;
the step of operating the automated system in the automated mode comprises operating the braking system in the automated mode if the aggregate expected error radius is less than the predetermined error threshold; and
the step of operating the automated system in the manual mode comprises operating the braking system in the manual mode if the aggregate expected error radius is greater than the predetermined error threshold.

8. A system for controlling an automated system of a vehicle, the system comprising:
a plurality of different input systems used in connection with the vehicle, the plurality of different input systems each configured to provide respective inputs; and
a processor coupled to the plurality of different input systems, the processor configured to at least facilitate:
  estimating a current position of the vehicle using the respective inputs from each of the plurality of different input systems, generating a current position estimate based on the estimating;
  estimating an aggregate error for the current position estimate, the aggregate error comprising an aggregate expected error radius for the current position estimate, wherein the aggregate expected error radius is estimated by:
    estimating a respective error measure for each of the plurality of different input systems, the respective error measure comprising, for each particular input system, a respective error radius for the particular input system; and
    aggregating the respective error measures for each of the plurality of different input systems; to thereby generate the aggregate error comprising the aggregate expected error radius for the current position estimate; and
  controlling the automated system using the current position estimate and the aggregate expected error radius.

9. The system of claim 8, wherein:
the plurality of different input systems comprises a satellite-based positioning system, a cellular communication system, and one or more vehicle sensors; and
the processor is further configured to at least facilitate:
  obtaining inputs from the satellite-based positioning system, the cellular communication system, and the one or more vehicle sensors; and estimating the current position of the vehicle using inputs from the satellite-based positioning system, the cellular communication system, and the one or more vehicle sensors.

10. The system of claim 8, wherein the processor is further configured to at least facilitate:
   obtaining satellite position inputs from a global positioning system (GPS) or global orbiting navigation satellite system (GLONASS), obtaining satellite correction data from a cellular communication system, and vehicle inertial measurement data provided via an inertial measurement sensor of the vehicle; and
   estimating the current position of the vehicle using the satellite position inputs from the GPS or GLONASS system, the satellite correction data from the cellular communication system, and the vehicle inertial measurement data from the inertial measurement sensor of the vehicle.

11. The system of claim 10, further comprising:
   a memory;
   wherein the processor is configured to at least facilitate:
      retrieving a predetermined error threshold from the memory;
      operating the automated system in an automatic mode, without driver intervention, if the aggregate expected error radius is less than the predetermined error threshold; and
      operating the automated system in a manual mode, without driver intervention, if the aggregate expected error radius is greater than the predetermined error threshold.

12. The system of claim 11, wherein:
   the automated system comprises a steering system of the vehicle; and
   the processor is configured to at least facilitate:
      operating the steering system in the automated mode if the aggregate expected error radius is less than the predetermined error threshold; and
      operating the steering system in the manual mode if the aggregate expected error radius is greater than the predetermined error threshold.

13. A vehicle comprising:
   one or more automated driving systems;
   a plurality of different input systems used in connection with the vehicle, the plurality of different input systems configured to provide inputs; and
   a processor coupled to the plurality of different input systems, the processor configured to at least facilitate:
      estimating a current position of the vehicle using the inputs from each of the plurality of different input systems generating a current position estimate based on the estimating;
      estimating an aggregate error for the current position estimate, the aggregate error comprising an aggregate expected error radius for the current position estimate, wherein the expected error radius is estimated by:
         estimating a respective error measure for each of the plurality of different input systems, the respective error measure comprising, for each particular input system, a respective error radius for the particular input system; and
         aggregating the respective error measures for each of the plurality of different input systems; to thereby generate the aggregate error comprising the aggregate expected error radius for the current position estimate; and
      controlling the one or more automated driving systems using the current position estimate and the aggregate expected error radius.

14. The vehicle of claim 13, wherein:
   the plurality of different input systems comprises a satellite-based positioning system, a cellular communication system, and one or more vehicle sensors; and
   the processor is further configured to at least facilitate:
      obtaining inputs from the satellite-based positioning system, the cellular communication system, and the one or more vehicle sensors; and
      estimating the current position of the vehicle using inputs from the satellite-based positioning system, the cellular communication system, and the one or more vehicle sensors.

15. The vehicle of claim 13, further comprising:
   a memory;
   wherein the processor is configured to at least facilitate:
      retrieving a predetermined error threshold from the memory;
      operating the one or more automated driving systems in an automatic mode, without driver intervention, if the aggregate expected error radius is less than the predetermined error threshold; and
      operating the one or more automated driving systems in a manual mode, without driver intervention, if the aggregate expected error radius is greater than the predetermined error threshold.

16. The vehicle of claim 15, wherein:
   the one or more automated driving systems comprises a steering system of the vehicle; and
   the processor is configured to at least facilitate:
      operating the steering system in the automated mode if the aggregate expected error radius is less than the predetermined error threshold; and
      operating the steering system in the manual mode if the aggregate expected error radius is greater than the predetermined error threshold.

17. The vehicle of claim 15, wherein:
   the one or more automated driving systems comprises a braking system of the vehicle; and
   the processor is configured to at least facilitate:
      operating the braking system in the automated mode if the aggregate expected error radius is less than the predetermined error threshold; and
      operating the braking system in the manual mode if the aggregate expected error radius is greater than the predetermined error threshold.

* * * * *